June 9, 1925.                              1,541,339
C. W. FINCH
HARNESS HAME HOOK
Filed April 18, 1922
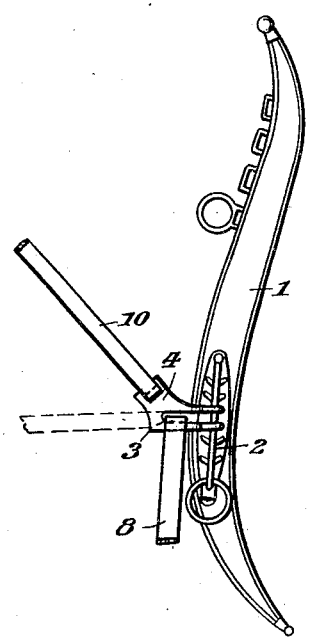
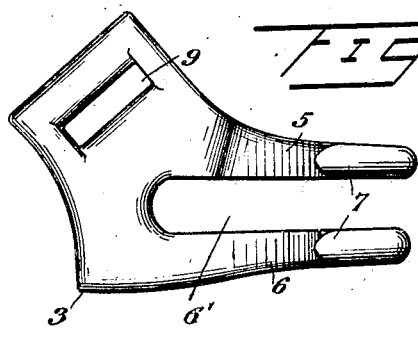
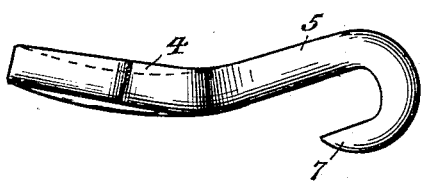
Inventor
C.W.Finch
By William J. Jacobi
Attorney Patented June 9, 1925.

1,541,339

UNITED STATES PATENT OFFICE.

CHARLES W. FINCH, OF VANLEER, TENNESSEE.

HARNESS HAME HOOK.

Application filed April 18, 1922. Serial No. 554,718.

*To all whom it may concern:*

Be it known that CHARLES W. FINCH, a citizen of the United States, residing at Vanleer, in the county of Dickson and State of Tennessee, has invented certain new and useful Improvements in Harness Hame Hooks, of which the following is a specification.

This invention relates to an improved harness hame hook, adapted to be attached to the present type of hame and has for its primary object to provide a quick and easy means for connecting the traces to the hame.

A further object of the invention is to provide a harness hame hook having means connecting the hook with a back strap so that the strain of holding back when going down an incline will be brought to bear directly on the shoulders of the draft animal.

A further object of the invention is to provide a harness hame hook that is simple in construction, durable, efficient for the purpose intended and one that can be manufactured and placed on the market at a relatively low cost.

These and like objects of my invention will be better understood as the description proceeds and as same is specifically pointed out in the appended claim.

Referring to the accompanying drawing which forms a part of this specification,

Figure 1 is a perspective view of my invention attached to a hame.

Figure 2 is a perspective view of same detached from the hame, and

Figure 3 is a side elevation of same.

Referring to the drawing in detail, like numerals will be used to designate like parts in the different views.

The numeral 1 denotes a hame of the usual construction provided with means positioned on the hame as indicated by the numeral 2 for the purpose of connecting thereto my improved harness hame hook 3. My improved harness hame hook comprises a body 4 having a pair of arms 5 and 6 extending outwardly at an obtuse angle from the body portion 4, and each of the arms 5 and 6 have a hook 7 formed on the end of same, said hooks adapted to be fastened in engagement with means carried by the hame 1, as indicated by the numeral 2. The arms 5 and 6 are spaced apart to provide an elongated slot 6' for fastening a trace 8 between the arms 5 and 6 as is clearly shown in Fig. 1.

In the body of the hame hook is provided a slot 9 for the purpose of receiving therein a backing strap 10.

From the foregoing description of my invention taken in connection with the accompanying drawing, it can be readily seen that the slot formed between the arms 5 and 6 for the purpose of permitting fastening means for the trace 8 will allow the pull when the animal is in motion to be directly on the shoulders of the animal, and that in going down an incline, the backing strap 10 will also exert a pull on the hook 3 which will cause the strain of holding back by the draft animal to be on the shoulders of same.

From the foregoing description of my invention taken in connection with the accompanying drawing, it is obvious that I have provided a harness hame hook that is not only efficient, but will also allow the draft animal to pull and hold back a heavier load with less exertion.

While I have shown and described the preferred form of my invention, I realize that various minor changes may be resorted to, without departing from the spirit and scope of the invention as claimed, therefore, I do not wish to limit myself to the exact details of construction shown, nor to the combination and arrangement of parts.

What I claim as new and desire to secure by Letters Patent is:—

In a harness hame connector of the class described, a body portion, a pair of spaced arms extending therefrom at an obtuse angle thereto providing therebetween an elongated slot for the reception of a trace extending vertically, hooks at the outer free ends of said arms for engagement with a hame, said body portion being provided with an angularly disposed slot for receiving a backing strap.

In testimony whereof I affix my signature.

CHARLES W. FINCH.